United States Patent
Choi et al.

(10) Patent No.: US 10,584,285 B2
(45) Date of Patent: Mar. 10, 2020

(54) PROCESS TO PRODUCE BLOWN ASPHALT

(71) Applicant: SAUDI ARABIAN OIL COMPANY, Dhahran (SA)

(72) Inventors: Ki-Hyouk Choi, Dhahran (SA); Mazin M. Fathi, Dhahran (SA)

(73) Assignee: Saudi Arabian Oil Company (SA)

( * ) Notice: Subject to any disclaimer, the term of this patent is extended or adjusted under 35 U.S.C. 154(b) by 0 days.

(21) Appl. No.: 16/278,540

(22) Filed: Feb. 18, 2019

(65) Prior Publication Data

US 2019/0185756 A1 Jun. 20, 2019

Related U.S. Application Data

(62) Division of application No. 15/686,381, filed on Aug. 25, 2017, now Pat. No. 10,246,642.

(51) Int. Cl.

| | | |
|---|---|---|
| *C10C 3/04* | (2006.01) | |
| *C10G 31/08* | (2006.01) | |
| *C10G 53/14* | (2006.01) | |
| *C10C 3/00* | (2006.01) | |
| *C10G 21/02* | (2006.01) | |
| *C08L 95/00* | (2006.01) | |

(52) U.S. Cl.
CPC ............... *C10C 3/04* (2013.01); *C10C 3/005* (2013.01); *C10G 21/02* (2013.01); *C10G 31/08* (2013.01); *C10G 53/14* (2013.01); *C08J 2495/00* (2013.01); *C08L 95/00* (2013.01); *C10G 2300/805* (2013.01)

(58) Field of Classification Search
CPC ............................................. B01J 2219/00006
See application file for complete search history.

(56) References Cited

U.S. PATENT DOCUMENTS

| | | | |
|---|---|---|---|
| 2,277,842 A | 3/1942 | Bray | |
| 2,762,756 A | 9/1956 | Kinnaird, Jr. | |
| 4,933,067 A | 6/1990 | Rankel | |
| 6,663,954 B2 | 12/2003 | Rouse et al. | |
| 7,264,710 B2 | 9/2007 | Hokari et al. | |
| 7,909,985 B2 | 3/2011 | Hong et al. | |
| 8,157,003 B2 | 4/2012 | Hackett et al. | |
| 8,394,260 B2 | 3/2013 | Choi | |
| 8,529,687 B2 | 9/2013 | Duyvesteyn et al. | |
| 9,447,327 B2 | 9/2016 | Aldous | |
| 2009/0206006 A1 | 8/2009 | Allam | |
| 2010/0189610 A1 | 7/2010 | Allam | |
| 2011/0147266 A1* | 6/2011 | Choi | C10G 9/00 208/85 |
| 2011/0233105 A1 | 9/2011 | Bailey | |
| 2011/0315600 A1 | 12/2011 | Choi et al. | |
| 2012/0061294 A1 | 3/2012 | Choi et al. | |
| 2013/0319909 A1 | 12/2013 | Moran et al. | |
| 2014/0374310 A1 | 12/2014 | Aldous | |
| 2015/0105494 A1 | 4/2015 | Naidoo et al. | |
| 2015/0105495 A1 | 4/2015 | Naidoo et al. | |
| 2015/0105496 A1 | 4/2015 | Naidoo et al. | |
| 2015/0112001 A1 | 4/2015 | Naidoo et al. | |
| 2015/0321975 A1 | 11/2015 | Choi et al. | |
| 2017/0240819 A1 | 8/2017 | Snow et al. | |

OTHER PUBLICATIONS

Chaffin, et al., Supercritical Fractions as Asphalt Recycling Agents and Prliminary Aging Studies on Recycled Asphalts, 36 IND. Eng. Chem. Res. 656-666 (1997).
The International Search Report and Written Opinion for related PCT application PCT/US2018/047410 dated Oct. 26, 2018.
Sato, et al., Upgrating of Asphalt with and without Partial Oxidation in Supercritical Water, 82 Fuel 1231-1239 (2003).
Vassiliev, et al., Air Blowing of Supercritical Asphalt Fractions, 40 Ind. Eng. Chem. Res. 1773-1780 (2001).

* cited by examiner

*Primary Examiner* — Randy Boyer
(74) *Attorney, Agent, or Firm* — Bracewell LLP; Constance G. Rhebergen

(57) ABSTRACT

A process for producing blown asphalt comprising the steps of mixing a heated hydrocarbon stream and a supercritical water in to produce a mixed stream, operating the supercritical water reactor to produce a reactor effluent, reducing the temperature of the reactor effluent in the cooler to produce a cooled effluent, feeding the cooled effluent through a depressurizing device to produce a depressurized stream, separating the depressurized stream in the flash drum to produce a light fraction stream and a heavy fraction stream, the heavy fraction stream contains a maltene fraction, an asphaltene fraction, and water, introducing the heavy fraction stream to a storage tank, withdrawing an oxidizing reactor feed from the storage tank, introducing the oxidizing reactor feed to an oxidation reactor, and operating the oxidation reactor at an oxidation temperature and an oxidation pressure to produce a product effluent that comprises an oxidized asphaltene fraction.

9 Claims, 3 Drawing Sheets

PROCESS TO PRODUCE BLOWN ASPHALT

CROSS REFERENCE TO RELATED APPLICATIONS

This application claims priority from U.S. Non-Provisional application Ser. No. 15/686,381 filed on Aug. 25, 2017. For purposes of United States patent practice, this application incorporates the contents of the non-provisional application by reference in its entirety.

TECHNICAL FIELD

Disclosed are methods for upgrading petroleum. Specifically, disclose are methods and systems for upgrading petroleum by removal of asphaltenes.

BACKGROUND

There are several types of asphalts such as asphalt cement, liquid asphalt, and blown asphalt. Blown asphalt can contain oxidized asphalt which has higher softening point than non-oxidized asphalt. Blown asphalt is suitable for roofing, pipe insulation, sealing, and water-proofing.

Oxidation of asphalt to produce blown asphalt is generally conducted between 400 degrees Fahrenheit (deg F.) and 600 deg F. (204 degrees Celsius (deg C.)-315 deg C.) in the presence of flowing air. A catalyst such as phosphorous pentoxide and ferric chloride, can be added to facilitate oxidation.

Oxidation of asphalt includes many reactions. Major reactions are dehydrogenation, polycondensation, and coupling which leads to a product having higher molecular weight and higher softening point. The resin fraction of crude oil, which has more polar constituents than other fractions of crude oil, such as saturate, aromatics, and asphalthene) is easily polycondensed by oxidation.

The process to produce blown asphalt experiences slow mass transfer rates of gaseous oxygen into the viscous asphalt matrix that can limit the extent of oxidation. Catalyst can be used to increase the oxidation at low temperatures but catalysts increase the cost and require sensitive handling.

Asphaltenes can be used to produce blown asphalt. Unsaturated carbon to carbon bonds are more susceptible to oxidation than saturated carbon to carbon bonds. Common asphalt from conventional refining processes does not contain unsaturated bonds unless the refining process is a coker or other thermal cracking unit. However, asphaltenes from conventional thermal cracking units are not suitable feedstocks for blown asphalt due to the presence of solid coke in the asphaltene matrix.

SUMMARY

Disclosed are methods for upgrading petroleum. Specifically, disclose are methods and systems for upgrading petroleum by removal of asphaltenes.

In a first aspect, a process for producing blown asphalt is provided. The process includes the steps of mixing a heated hydrocarbon stream and a supercritical water in a mixer to produce a mixed stream, where the heated hydrocarbon stream has a temperature less than the temperature of the critical temperature of water and a pressure between 23 MegaPascals (MPa) and 35 MPa, where the supercritical water has a temperature between the critical temperature of water and 600 deg C. and a pressure of 23 MPa to 35 MPa, where the mixed stream includes water and hydrocarbons having an asphaltene fraction, introducing the mixed stream to a supercritical water reactor, operating the supercritical water reactor at a reaction temperature and a reaction pressure for a residence time to produce a reactor effluent, introducing the reactor effluent to a cooler, reducing the temperature of the reactor effluent in the cooler to produce a cooled effluent, feeding the cooled effluent through a depressurizing device to produce a depressurized stream, introducing the depressurized stream to a flash drum, separating the depressurized stream in the flash drum to produce a light fraction stream and a heavy fraction stream, the light fraction stream contains light hydrocarbons and water, the heavy fraction stream contains a maltene fraction, an asphaltene fraction, and water. The process further includes the steps of introducing the heavy fraction stream to a storage tank configured to store the heavy fraction stream, withdrawing an oxidizing reactor feed from the storage tank, introducing the oxidizing reactor feed to an oxidation reactor, introducing an oxygen source to the oxidation reactor, where the oxidation source includes molecular oxygen, and operating the oxidation reactor at an oxidation temperature and an oxidation pressure to produce a product effluent, the product effluent includes an oxidized asphaltene fraction.

In certain aspects, the process further includes the steps of introducing a hydrocarbon feedstock to a feedstock pump, increasing a pressure of the hydrocarbon feedstock to produce a pressurized feedstock, introducing the pressurized feedstock to a feedstock exchanger, increasing the temperature of the pressurized feedstock to produce the heated hydrocarbon stream, introducing a water feed to a water pump, increasing a pressure of the water feed to produce a pressurized water, introducing the pressurized water to a water heater, and increasing the temperature of the pressurized water to produce the supercritical water. In certain aspects, the process further includes the steps of introducing the light fraction stream to a lights cooler, reducing the temperature of the light fraction stream in the lights cooler to produce a cooled light fraction, introducing the cooled light fraction to a vapor separator, separating the cooled light fraction in the vapor separator to produce a vapor stream and a liquid stream, introducing the liquid stream into an oil separator, and separating the liquid stream in the oil separator to produce an upgraded hydrocarbon stream and a water stream, where the upgraded hydrocarbon stream includes upgraded hydrocarbons. In certain aspects, the process further includes the steps of introducing the heavy fraction stream to a solvent deasphalting unit prior to the step of introducing the heavy fraction stream to the storage tank, separating the heavy fraction stream in the solvent deasphalting unit to produce an asphaltene stream and a maltene stream, introducing the asphaltene stream to the storage tank, withdrawing a reactor feed from the storage tank, and introducing the reactor feed to the oxidation reactor at an oxidation temperature and an oxidation pressure to produce an asphaltene product, where the asphaltene product includes an oxidized asphaltene fraction. In certain aspects, a hydrocarbon feedstock of the heated hydrocarbon feedstock is selected from the group consisting of whole range crude oil, reduced crude oil, atmospheric distillates, atmospheric residue, vacuum distillates, vacuum residue, cracked product streams, produced oils, decanted oil, heavy hydrocarbon streams from an ethylene plant, liquefied coal, biomaterial-derivatives and combinations thereof. In certain aspects, a ratio of the volumetric flow rate of the heated hydrocarbon stream to the volumetric flow rate of supercritical water is between 1:10 and 10:1 at SATP. In certain aspects, the reaction temperature is greater than the critical temperature of water, the reaction pressure is between 23 MPa and 35 MPa, and the residence time is between 5 seconds and 30 minutes. In certain aspects, the oxidation reactor is a semi-batch reactor. In certain aspects, the oxidation temperature is between 150 deg C. and 300 deg C., the oxidation pressure is between 1 psig and 100 psig, and the reaction time is between 10 minutes and 240 minutes.

In a second aspect, a system for producing blown asphalt is provided. The system includes a mixer configured to mix a heated hydrocarbon stream and a supercritical water to produce a mixed stream, a supercritical water reactor fluidly connected to the mixer, the supercritical water reactor configured to produce a reactor effluent, a cooler fluidly connected to the supercritical water reactor, the cooler configured to reduce the temperature of the reactor effluent to produce a cooled effluent, a depressurizing device fluidly connected to the cooler, the depressurizing device configured to reduce the pressure of the cooled effluent to produce a depressurized stream, a flash drum fluidly connected to the depressurizing device, the flash drum configured to separate the depressurized stream to produce a light fraction stream and a heavy fraction stream, a storage tank fluidly connected to the flash drum, the storage tank configured to store the heavy fraction stream, and an oxidation reactor fluidly connected to the storage tank, the oxidation reactor configured to produce a product effluent.

In certain aspects, the system further includes a feedstock pump configured to increase a pressure of a hydrocarbon feedstock to produce a pressurized feedstock, a feedstock exchanger fluidly connected to the feedstock pump, the feedstock exchanger configured to increase the temperature of the pressurized feedstock to produce the heated hydrocarbon stream, a water pump, the water pump configured to increase a pressure of the water feed to produce a pressurized water, and a water heater fluidly connected to the water pump, the water heater configured to increase the temperature of the pressurized water to produce the supercritical water. In certain aspects, the system further includes a lights cooler fluidly connected to the flash drum, the lights cooler configured to reduce the temperature of the light fraction stream in the lights cooler to produce a cooled light fraction, a vapor separator fluidly connected to the lights cooler, the vapor separator configured to separate the cooled light fraction to produce a vapor stream and a liquid stream, and an oil separator fluidly connected to the vapor separator, the oil separator configured to separate the liquid stream to produce an upgraded hydrocarbon stream and a water stream, where the upgraded hydrocarbon stream includes upgraded hydrocarbons. In certain aspects, the system further includes a solvent deasphalting unit fluidly connected to the flash drum, the solvent deasphalting unit configured to separate the heavy fraction to produce an asphaltene stream and a maltene stream, the storage tank fluidly connected to the solvent deasphalting unit, and the oxidation reactor fluidly connected to the storage tank, the oxidation reactor configured to produce an asphaltene product, where the asphaltene product includes an oxidized asphaltene fraction. In certain aspects, a hydrocarbon feedstock of the heated hydrocarbon feedstock is selected from the group consisting of whole range crude oil, reduced crude oil, atmospheric distillates, atmospheric residue, vacuum distillates, vacuum residue, cracked product streams, produced oils, decanted oil, heavy hydrocarbon streams from an ethylene plant, liquefied coal, biomaterial-derivatives and combinations thereof. In certain aspects, where a ratio of the volumetric flow rate of the heated hydrocarbon stream to the volumetric flow rate of supercritical water is between 1:10 and 10:1 at SATP. In certain aspects, where reaction temperature in the supercritical water reactor is greater than the critical temperature of water, a reaction pressure in the supercritical water reactor is between 23 MPa and 35 MPa, and a residence time in the supercritical water reactor is between 5 seconds and 30 minutes. In certain aspects, where the oxidation reactor is a semi-batch reactor. In certain aspects, where an oxidation temperature in the oxidation reactor is between 150 deg C. and 300 deg C., an oxidation pressure in the oxidation reactor is between 1 psig and 100 psig, and a reaction time in the oxidation reactor is between 10 minutes and 240 minutes.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

DETAILED DESCRIPTION

Figure 1:
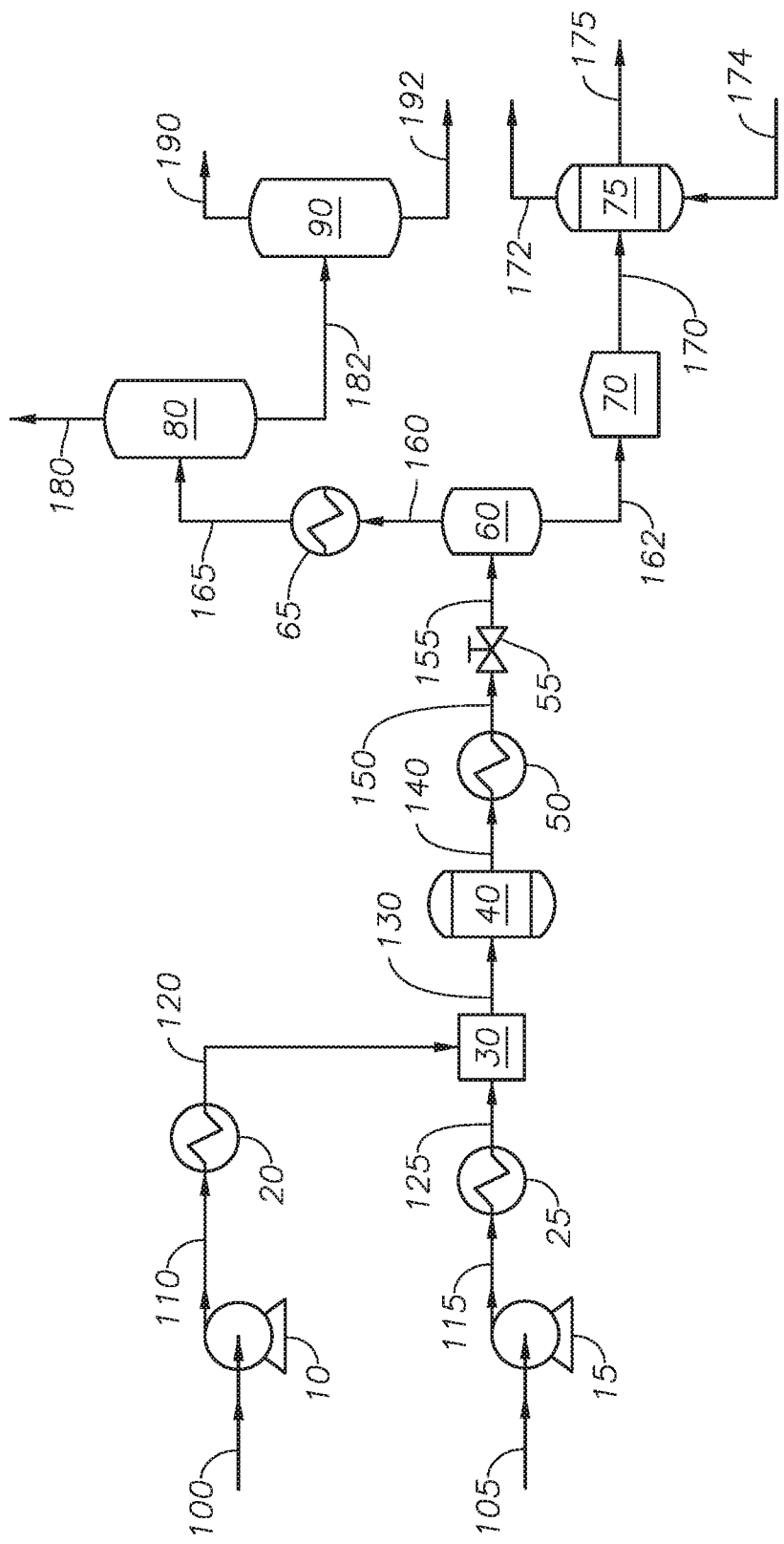
FIG. 1 provides a process diagram of an embodiment of the process.

While the scope will be described with several embodiments, it is understood that one of ordinary skill in the relevant art will appreciate that many examples, variations and alterations to the apparatus and methods described herein are within the scope and spirit. Accordingly, the embodiments described are set forth without any loss of generality, and without imposing limitations, on the embodiments. Those of skill in the art understand that the scope includes all possible combinations and uses of particular features described in the specification.

Described here are processes and systems for the removal of asphaltenes from a petroleum stream. Advantageously, the processes and systems described are in the absence of paraffinic solvents, which avoids the generation of solvent waste. Advantageously, the processes and systems described remove asphaltenes under mild conditions which reduces the production of coke. Advantageously, the processes and systems described operate at low temperatures and atmospheric pressures resulting in a process which consumes less energy as compared to other processes to remove asphaltenes. Advantageously, the processes and systems described provide for removal of asphaltenes in the absence of the deactivation of catalysts. Advantageously the water present in the matrix of the heavy weight fraction improves the mass transfer of molecular oxygen which increases the production of blown asphalt.

As used throughout, "asphaltenes" refers to a mix of high molecular weight polycyclic aromatic hydrocarbons, which consist primarily of carbon, hydrogen, nitrogen, oxygen and sulfur with trace amounts of metals such as vanadium and nickel, and a hydrogen to carbon ratio of about 1.2 to 1. Operationally, asphaltenes refers to the n-heptane-insoluble, toluene soluble component of a carbonaceous material. Asphaltenes are the sticky, black, highly viscous residue of distillation processes. Asphaltenes contain highly polar species that tend to associate or aggregate, which has made complete molecular analysis of asphaltenes, for example by mass spectrometry, difficult.

As used throughout, "upgraded hydrocarbon" means a hydrocarbon with one or all of increased API gravity, decreased amount of impurities, such as sulfur, nitrogen, and metals, decreased amount of asphaltene, and increased amount of distillate relative to the hydrocarbon in process feed stream. One of skill in the art understands that upgraded hydrocarbons can have a relative meaning such that a stream of upgraded hydrocarbons can be upgraded in comparison to another stream of hydrocarbons, but can still contain undesirable components such as impurities.

As used throughout, "semi-batch" refers to a process where a reactor is discharged after the reaction time and then filled with new reactant fluid.

As used throughout, "dip tube" refers to a length of piping where the outlet is below the fluid level in a vessel.

As used throughout, "externally supplied catalyst" refers to any man-made catalyst source not organic to the hydrocarbon feedstock of the process, such as a catalyst bed in a reactor, a catalyst introduced to the reactor, and a catalyst mixed with the feed to a reactor; externally supplied catalyst does not exclude components in the hydrocarbon feedstock that could catalyze other reactions in the process, such as the presence of metals, such as vanadium, nickel, and iron.

As used throughout, "dull separation" refers to separation where the boiling point in the separation is not tightly controlled or alternately is not controlled in multiple stages.

As used throughout, "maltene" or "maltene fraction" refers to the n-heptane solution fraction of hydrocarbons.

As used throughout, "blown asphalt" refers to a mix of an oxidized asphaltene fraction and a non-oxidized asphaltene fraction.

With reference to FIG. 1, a process flow diagram for the process to produce blown asphalt is provided.

Hydrocarbon feedstock 105 is transferred to feedstock exchanger 25 through feedstock pump 15. Hydrocarbon feedstock 105 can be any source of hydrocarbons containing an asphaltene fraction and where at least 10% of the components have a true boiling point of greater than 650 degrees Fahrenheit (deg F.). Hydrocarbon feedstock 105 can have a kinematic viscosity of less than 10,000 centistokes (cSt) at 300 deg F., alternately less than 1,000 cSt at 300 deg F., and alternately between 6 cSt and 1,000 cSt at 300 deg F. Examples of hydrocarbons include whole range crude oil, reduced crude oil, atmospheric distillates, atmospheric residue, vacuum distillates, vacuum residue, cracked product streams, produced oils, decanted oil, heavy hydrocarbon streams from an ethylene plant, liquefied coal, biomaterial-derivatives and combinations thereof. Cracked product streams can include light cycle oil and coker gas oil. Biomaterial-derivatives can include bio fuel oil. The source of hydrocarbon feedstock 105 can be other streams from a refinery. The asphaltene fraction of hydrocarbon feedstock 105 can be between 2 percent (%) by weight and 50% by weight, alternately between 5% by weight and 50% by weight, alternately between 10% by weight and 50% by weight, alternately between 2% by weight and 25% by weight, alternately between 5% by weight and 25% by weight, alternately between 10% by weight and 25% by weight alternately between 2% by weight and 16% by weight, alternately between 5% by weight and 16% by weight, and alternately between 10% by weight and 16% by weight. An asphaltene fraction in hydrocarbon feedstock 105 of less than 2% by weight can make the process inefficient. An asphaltene fraction of greater than 50% by weight can result in a supercritical water process that results in increased coke formation. In at least one embodiment hydrocarbon feedstock 105 is a vacuum residue fraction from an Arab light crude with 2% by weight asphaltene fraction. In at least one embodiment, hydrocarbon feedstock 105 is a vacuum residue fraction from an Arab heavy crude with 16% by weight asphaltene fraction.

Feedstock pump 15 increases the pressure of hydrocarbon feedstock 105 to produce pressurized feedstock 115. Feedstock pump 15 can be any type of pump capable of increasing the pressure of a hydrocarbon stream. In at least one embodiment, feedstock pump 15 is a diaphragm metering pump. The pressure of pressurized feedstock 115 can be greater than the critical pressure of water, alternately between 23 MPa and 35 MPa, and alternately between 24 MPa and 30 MPa.

Feedstock exchanger 25 increases the temperature of pressurized feedstock 115 to produce heated hydrocarbon stream 125. Feedstock exchanger 25 can be any type of heat exchanger capable of increasing the temperature of a hydrocarbon stream. The temperature of heated hydrocarbon stream 125 is below the critical temperature of water, alternately below 350 degrees Celsius (deg C.), and alternately between 100 deg C. and 250 deg C.

Water feed 100 is transferred to water heater 20 through water pump 10. Water feed 100 can be any demineralized water having a conductivity lower than 1.0 microSiemens per centimeter ($\mu S \cdot cm^{-1}$), and alternately less than 0.1 $\mu S \cdot cm^{-1}$.

Water pump 10 increases the pressure of water feed 100 to produce pressurized water 110. Water pump 10 can be any type of pump capable of increasing the pressure of a water stream. In at least one embodiment, water pump 10 is a diaphragm metering pump. The pressure of pressurized water 110 can be greater than the critical pressure of water, alternately between 23 MPa and 35 MPa, and alternately between 24 MPa and 30 MPa.

Water heater 20 increases the temperature of pressurized water 110 to produce supercritical water 120. Water heater 20 can be any type of heat exchanger capable of increasing the temperature of a water stream. In at least one embodiment, water heater 20 is a cross heat exchanger capable of recovering heat from reactor effluent 140 to increase the temperature of pressurized water 110 and reduce the temperature of reactor effluent 140. The temperature of supercritical water 120 is between the critical temperature of water and 600 degrees Celsius (deg C.) and alternately between 380 deg C. and 600 deg C.

Supercritical water 120 and heated hydrocarbon stream 125 are introduced to mixer 30 to produce mixed stream 130. The ratio of the volumetric flow rate of heated hydrocarbon stream 125 to the volumetric flow rate of supercritical water 120 is between 1:10 and 10:1 at standard ambient temperature and pressure (SATP), alternately between 1:5 and 5:1 at SATP, and alternately between 1:1 and 1:5 at SATP. In at least one embodiment, the volumetric flow rate of heated hydrocarbon stream 125 is less than the volumetric flow rate of supercritical water 120 which reduces the opportunity for hydrogen transfer between hydrocarbons in supercritical water reactor 40.

Mixer 30 can be any type of mixing device capable of mixing supercritical water 120 and heated hydrocarbon stream 125. Examples of mixer 30 can include an ultrasonic device and a tee fitting. Mixer 30 allows for thorough mixing of water and the hydrocarbons in heated hydrocarbon stream 125. Mixed stream 130 can be introduced to supercritical water reactor 40.

Supercritical water reactor 40 can be any type of reactor capable of maintaining conversion reactions at supercritical conditions. Examples of supercritical water reactor 40 can include a tubular-type vertical reactor, a tubular-type horizontal reactor, a vessel-type reactor, and a tank-type reactor. In embodiments where supercritical water reactor 40 is a vessel-type reactor or tank-type reactor supercritical water reactor 40 can include an internal mixing device. In at least one embodiment the internal mixing device is an agitator. Supercritical water reactor 40 can operate at a reaction temperature and a reaction pressure. The reaction temperature can be greater than the critical temperature of water, alternately between 380 deg C. and 480 deg C., and alternately between 390 deg C. and 420 deg C. The reaction pressure can be between 23 MPa and 35 MPa and alternately between 24 MPa and 30 MPa. The reaction pressure can be controlled by depressurizing device 55. The residence time of the fluids in supercritical water reactor 40 is between 5 seconds and 30 minutes, alternately between 5 seconds and 10 minutes. The residence time in supercritical water reactor 40 can be calculated by assuming the density of the fluid in the reactor is the density of water at the reaction temperature and reaction pressure.

Reactor effluent 140 includes an asphaltene fraction containing asphaltenes. As a result of reactions in the presence of supercritical water reactor 40 the asphaltenes in the asphaltene fraction contain olefinic bonds. The asphaltene fraction can include olefinic compounds, such as 1-olefin, cyclo-olefins, and conjugated olefins. Advantageously, the supercritical water reactor produces asphaltene with olefinic bonds while minimizing the formation of coke. Reactor effluent 140 exits supercritical water reactor 40.

Reactor effluent 140 can be introduced to cooler 50 to produce cooled effluent 150. Cooler 50 can be any heat exchanger capable of reducing the temperature of reactor effluent 140. The temperature of cooled effluent 150 is less than the critical temperature of water. In at least one embodiment, the temperature of cooled effluent 150 is between 250 deg C. and 373 deg C. In at least one embodiment, the process for upgrading petroleum is in the absence of cooler 50. The addition of cooler 50 and the cooled effluent 150 can be determined based on the desired conditions in flash drum 60 and the composition of reactor effluent 140.

Cooled effluent 150 can be introduced to depressurizing device 55 to produce depressurized stream 155. Depressurizing device 55 can be any type of pressure regulator configured to reduce the fluid pressure of cooled effluent 150. Examples of depressurizing device 55 include a back pressure regulator. The pressure of depressurized stream 155 for a given temperature is below the pressure at which steam is generated. In at least one embodiment, the pressure of depressurized stream 155 is less than 2 MPa. Depressurized stream 155 is introduced to flash drum 60.

Flash drum 60 separates depressurized stream 155 to produce light fraction stream 160 and heavy fraction stream 162. The composition of light fraction stream 160 and the composition of heavy fraction stream 162 are determined based on the temperature and pressure in flash drum 60. The temperature and pressure can be set in order to achieve a certain composition in light fraction stream 160 or a composition in heavy fraction stream 162. Light fraction stream 160 contains water and light fractions of hydrocarbons. Heavy fraction stream 162 contains water and heavy fractions of hydrocarbons. In at least one embodiment, heavy fraction stream 162 contains water, a maltene fraction, and an asphaltene fraction.

Flash drum 60 can include an internal heating device or an external heating device to increase or maintain the temperature of flash drum 60 relative to the temperature of depressurized stream 155. Flash drum 60 can include an internal mixing device to enhance mixing of the fluid in flash drum 60.

In at least one embodiment, the temperature is determined based on the distillation cut point of depressurized stream 155 such that the 20% by volume of the distillation (referred to as the "T20") has an initial boiling point greater than 650 deg F. The cut point of distillation for atmospheric residue fraction is 650 deg F. The cut point of distillation for vacuum residue fraction is 1050 deg F. Because a flash drum has a dull separation performance, a T20 can be targeted. A T20 is also targeted to produce a heavy fraction stream that will flow. Asphaltene can be concentrated in the crude oil fraction that boils at greater than 1050 deg F. To reduce the viscosity of heavy fraction stream 162 a cut point of T20 can be used such that heavy fraction stream 162 contains an amount of the maltene fraction. The concentration of water in heavy fraction stream 162 can be less than 10% by weight, alternately between 0.1% by weight and 10% by weight, alternately between 0.5% by weight and 10% by weight, alternately between 0.1% by weight and 1% by weight, and alternately between 0.1% by weight and 5% by weight. In at least one embodiment, the concentration of water in heavy fraction stream 162 is 0.5% by weight. Advantageously, the water present in heavy fraction stream 162 is dispersed throughout the hydrocarbons in heavy fraction stream 162.

Light fraction stream 160 can be introduced to lights cooler 65. Lights cooler 65 can reduce the temperature of light fraction stream 160 to produce cooled light fraction 165. Cooled light fraction 165 can have a temperature in the range between 10 deg C. and 30 deg C. Cooled light fraction 165 can be introduced to one or more separation units. In at least one embodiment, cooled light fraction 165 is introduced to vapor separator 80. Vapor separator 80 separates cooled light fraction 165 into vapor stream 180 and liquid stream 182. Vapor stream 180 can include light gases and light hydrocarbons. Light hydrocarbons present in vapor stream 180 can include methane, ethane, propane, ethylene, propylene, and combinations thereof. Light gases can include carbon dioxide, water vapor, hydrogen sulfide, ammonia, and combinations thereof. Liquid stream 182 can include naphtha and gas oil range hydrocarbons. Liquid stream 182 can be introduced to oil separator 90. Oil separator 90 separates liquid stream 182 into water stream 192 and upgraded hydrocarbon stream 190. Water stream 192 contains water present in liquid stream 182. Upgraded hydrocarbon stream 190 contains upgraded hydrocarbons relative to hydrocarbon feedstock 105. In at least one embodiment, cooled light fraction 165 can be introduced to a three phase separator which can produce a gas product stream, a water containing stream, and a hydrocarbon containing stream.

Heavy fraction stream 162 can be introduced to storage tank 70. Storage tank 70 can be any type of vessel capable of storing a fluid upstream of a semi-batch process. The supercritical water reactor can be a continuous reactor and the oxidation reactor is a semi-batch reactor. Oxidizing reactor feed 170 can be withdrawn from storage tank 70 and introduced to oxidation reactor 75.

Oxidation reactor 75 can be any vessel capable of containing the oxidizing reaction of hydrocarbons. Oxidation reactor 75 can be a semi-batch reactor. In at least one embodiment, oxidation reactor 75 can include an internal agitator configured to mix the fluid in oxidation reactor 75.

In at least one embodiment, oxidation reactor is a semi-batch stirred reactor. The internal volume of oxidation reactor 75 can be designed based on the desired reaction time. The reaction time can be between 10 minutes and 240 minutes, and alternately between 60 minutes and 120 minutes. Reaction times exceeding 240 minutes can result in asphalt that is over-oxidized leading to a product effluent that has viscosity making the product effluent difficult to handle. Reaction times under 10 minutes can result in an asphalt product effluent that does not meet required quality targets, including softening point. Oxidation reactor 75 can have an internal heating element or an external heating element configured to maintain the oxidation temperature in oxidation reactor 75. The oxidation temperature in oxidation reactor 75 can be between 150 deg C. and 300 deg C., alternately between 150 deg C. and 250 deg C., alternately between 150 deg C. and 200 deg C., alternately between 200 deg C. and 250 deg C., alternately between 200 deg C. and 300 deg C., and alternately between 250 deg C. and 300 deg C. The oxidation pressure of oxidation reactor 75 can be between 1 pound per square inch gauge (psig) and 100 psig (6.89 kPa and 689 kPa), alternately between 1 psig and 50 psig (6.89 kPa and 344 kPa), and alternately between 1 psig and 10 psig (6.89 kPa and 68.9 kPa). A pump can be used to introduce oxidizing reactor feed 170 at the reaction pressure. Oxidation reactor 75 can be free from externally supplied catalyst. Metals originating in the hydrocarbon feedstock can be concentrated in the heavy fractions and can be oxidized by externally supplied oxygen in the oxidation reactor. Such metal oxides can have a catalytic effect in the oxidation reactor enhancing the oxidation reactions of the hydrocarbons.

Oxygen source 174 can be any oxygen containing gas with a concentration of molecular oxygen. Examples of oxygen source 174 can include air, oxygen enriched air, and pure oxygen. Oxygen source 174 can be introduced to oxidation reactor 75 through one or more dip tubes. The dip tubes are configured to provide the oxygen containing gas directly into the fluid in oxidation reactor 75. The dip tubes can include gas dispensers. A gas dispenser can be any mechanical device that can disperse gas into a liquid. Gas dispensers can include a sintered metal tip or sintered quartz. Advantageously, the gas dispensers provide uniform dispersion of the gas into the liquid in oxidation reactor and can increase the interface between gas and liquid. The use of dip tubes increases the dispersion of oxygen through the liquid. The flow rate of oxygen source 174 can be adjusted to maintain an oxygen concentration in exhaust gas 172 between 10% by volume and 50% by volume. The oxygen concentration in exhaust gas 172 can be monitored by an analyzer as part of a feedback loop to control the flow rate of oxygen source 174. In an embodiment where oxygen source 174 is air, the flow rate of oxygen source 174 is at least 1,000 standard cubic centimeters per minute (SCCM) for every 1 kilogram (kg) of oxidizing reactor feed 170. The molecular oxygen in oxygen source 174 reacts with the hydrocarbons in oxidation reactor 75 to oxidize the hydrocarbons, including the asphaltene fraction.

The water present in oxidizing reactor feed 170 acts as a miscibility agent to increase the diffusion of oxygen penetration into the asphaltene fraction of oxidizing reactor feed 170. Advantageously, combining the supercritical water reactor and the oxidation reactor in the same process ensures the water is mixed with the asphaltene fraction when the asphaltene fraction is introduced to the oxidation rector. Introducing water directly to the oxidation reactor would not result in a well-mixed fluid with water mixed in the asphaltene fraction and in contact with the asphaltenes in the asphaltene fraction.

Exhaust gas 172 exits oxidation reactor 75. Exhaust gas 172 can be released periodically during the reaction time as needed to maintain the oxidation pressure in oxidation reactor 75. Exhaust gas 172 can be withdrawn at the conclusion of the reaction time. Exhaust gas 172 can be treated to meet environmental regulations and then released to atmosphere. In at least one embodiment, exhaust gas 172 can be treated and then recycled to oxidation reactor 75.

At the end of the reaction time, the entire liquid volume of oxidation reactor 75 can be removed as product effluent 175. Product effluent 175 can contain a blown asphalt, an oxidized maltene fraction, a non-oxidized maltene fraction, and water. Blown asphalt can include the oxidized asphaltene fraction and non-oxidized asphaltene fraction. Product effluent 175 can be further treated. In at least one embodiment, product effluent 175 can be introduced to a solvent extraction unit to remove the maltene fraction. In at least one embodiment, product effluent 175 can be introduced to a drying unit to remove water. In at least one embodiment, product effluent 175 can be mixed with additives in a blending unit prior to being introduced to a unit to produce a product blown asphalt.

Figure 2:
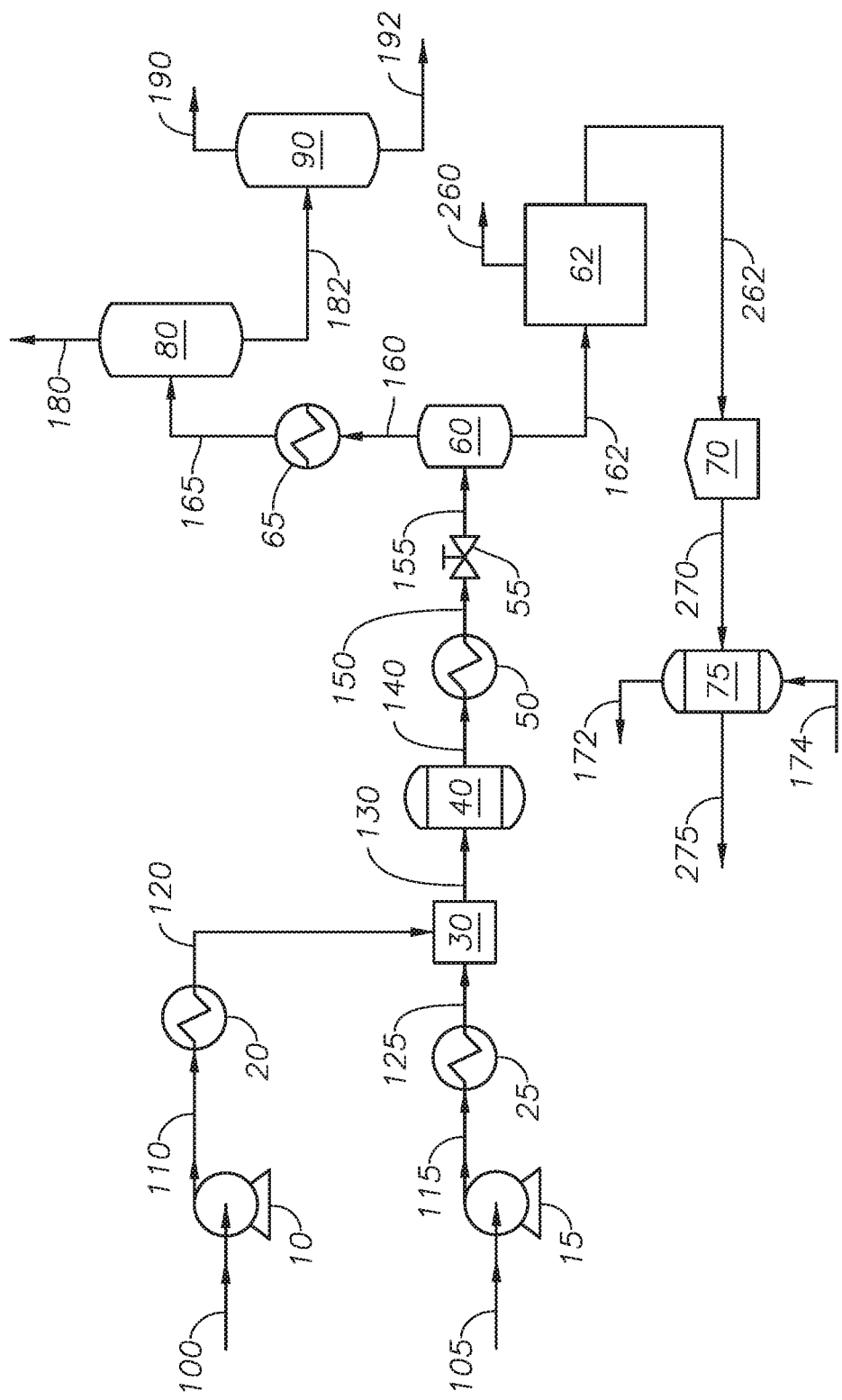
FIG. 2 provides a process diagram of an embodiment of the process.

Referring to FIG. 2, an embodiment of the process to produce asphaltene is provided. Heavy fraction 162 is introduced to solvent deasphalting unit 62. Solvent deasphalting unit 62 can be any polar-nonpolar continuous separation process. Solvent deasphalting unit 62 separates heavy fraction 162 into asphaltene stream 262 and maltene stream 260. Introducing heavy fraction 162 to a solvent deasphalting unit 62 upstream of oxidation reactor 75 results in a feed to the oxidation reactor 75 free of the maltene fraction, which produces an oxidized asphaltene fraction with fewer impurities. In at least one embodiment, maltene stream 260 can be combined with upgraded hydrocarbon stream 190. Asphaltene stream 262 is introduced to storage tank 70.

Reactor feed 270 is withdrawn from storage tank 70 and introduced to oxidation reactor 75. Oxidation reactor 75 is described with reference to FIG. 1. At the end of the reaction time, the entire liquid volume of oxidation reactor 75 can be removed as asphaltene product 275. Asphaltene product 275 can contain blown asphalt and water. Asphaltene product 275 can be further treated. In at least one embodiment, asphaltene product 275 can be introduced to a drying unit to remove water. In at least one embodiment, asphaltene product 275 can be mixed with additives in a blending unit prior to being introduced to a unit to produce blown asphalt.

In at least one embodiment, the system and process to separate asphaltenes are in the absence of adding externally supplied oxidant to the supercritical water reactor. Oxidant in the supercritical water reactor can produce carbon monoxide and carbon dioxide, but does not produce partially oxidized hydrocarbons because of the temperatures greater than supercritical temperature of water in the supercritical water reactor. In addition, any partially oxidized hydrocarbons are decomposed in the presence of supercritical water. The supercritical water reactor is in the absence of polycondensation reactions. Therefore, a process of an oxidation reactor upstream of a supercritical water reactor would not result in an oxidized asphaltene product. The supercritical water reactor provides a path for the water to be mixed with the hydrocarbons and penetrate throughout the heavy fraction. The water can mix by dissolving the maltene and swelling the asphaltene. Water or steam added to an oxidation would not be able to mix with the hydrocarbons and penetrate the heavy fraction. Under conditions in the oxidation reactor, steam has limited dissolution of the maltene and limited swelling of asphaltene.

EXAMPLES

Example 1

Figure 3:
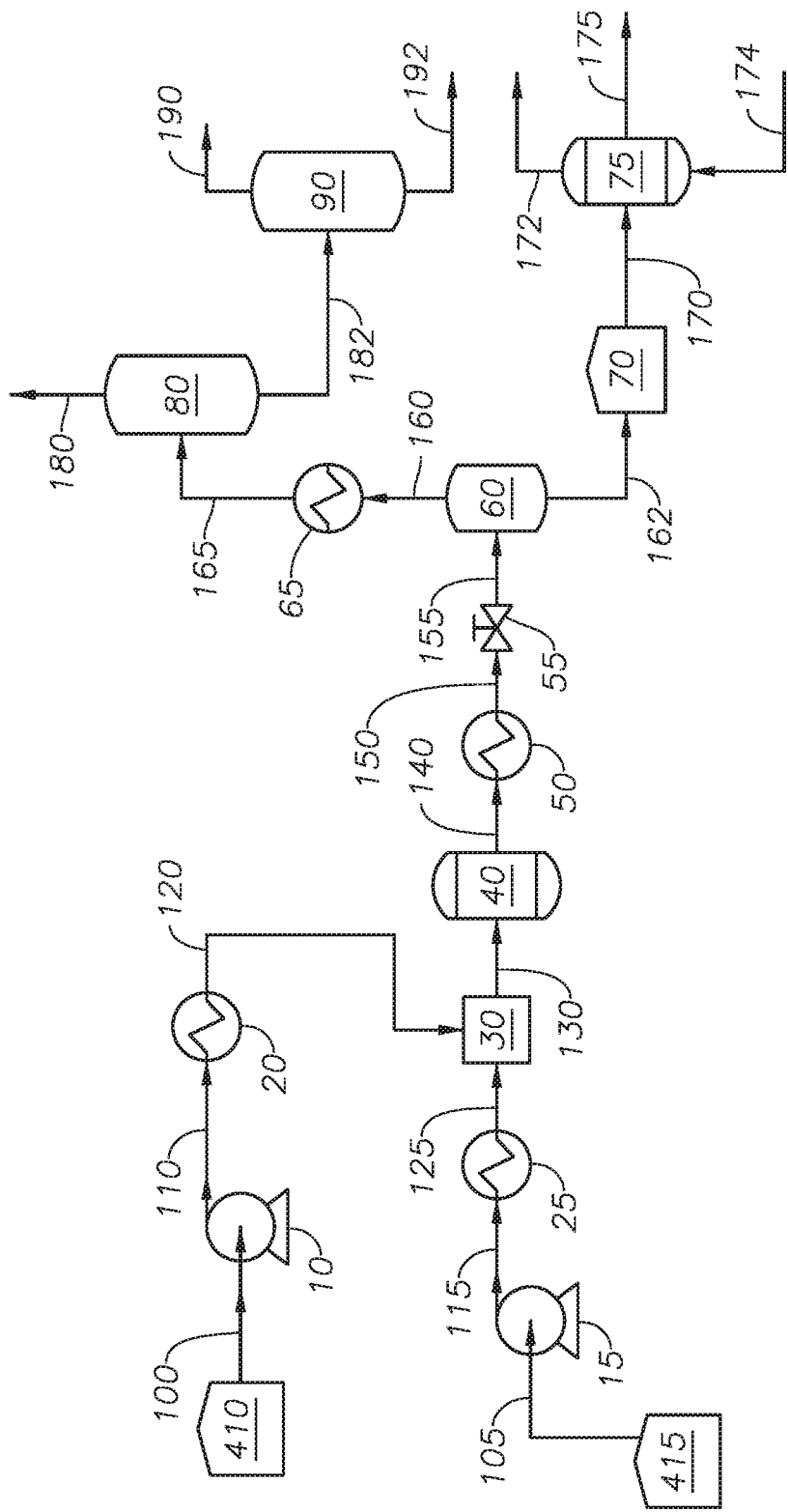
FIG. 3 provides a process diagram of an embodiment of the process.

Example 1 was performed in a pilot scale system based on the process flow diagram of FIG. 3. Hydrocarbon feedstock 105 was an atmospheric residue fraction from an Arab heavy crude oil with an API gravity of 10.3, a sulfur content of 5.2% by weight, and an asphaltene fraction of 10% by weight. The true boiling point fractions of hydrocarbon feedstock 105 are shown in Table 1.

TABLE 1

True Boiling Point Fractions of Hydrocarbon Feedstock in Example 1

| Distillation Yield (% by volume) | Temperature (deg C.) |
|---|---|
| 5% | 387 |
| 10% | 405 |
| 20% | 444 |
| 30% | 486 |
| 50% | 579 |
| 70% | 683 |
| 80% | 753 |
| 90% | 853 |
| 95% | 934 |

Hydrocarbon feedstock 105 was drawn from feed tank 415 where it was stored at 100 deg C. under a nitrogen purge to remove oxygen. Water feed 100 was drawn from water tank 410 which was purged by nitrogen to remove oxygen. Water feed 100 was pumped by water pump 10 at a volumetric flow rate of 0.2 liter/hour (L/hr) at SATP. Hydrocarbon feedstock 105 was pumped by feedstock pump 15 at a volumetric flow rate of 0.2 liter/hour (L/hr) at SATP. The ratio of the volumetric flow rate of heated hydrocarbon stream 125 to supercritical water 120 was 1:1. Feedstock exchanger 25 was an electric strip heater and the temperature of heated hydrocarbon stream 125 was 150 deg C. Water heater 20 was an electric pre-heater and the temperature of supercritical water 120 was 450 deg C.

Mixer 30 was a tee fitting with an internal diameter of 2.2 millimeters (mm). Supercritical water 120 and heated hydrocarbon stream 125 were introduced to mixer 30. The temperature of mixed stream 130, as measured by a thermocouple proximate to mixer 30, was 360 deg C. Mixed stream 130 was introduced to supercritical water reactor 40.

Supercritical water reactor 40 was a pair of vertical tubular continuous-flow type reactor with an internal diameter of 20.2 mm and a length of 500 mm. The two reactors were connected in series by one quarter inch tubing. Fluid direction was upflow. The temperature of each reactor was controlled by thermocouples located inside each reactor. The reaction temperature was set to 410 deg C. The residence time through supercritical water reactor 40 was seven minutes.

Cooler 50 was a double pipe type heat exchanger where tap water at 15 deg C. was circulated to cool reactor effluent 140. The flow rate of the tap water was controlled to maintain the temperature of cooled effluent 150 at 370 deg C. Depressurizing device 55 was a back pressure regulator and the pressure of depressurized stream 155 was 0.5 MPa.

Flash drum 60 had an internal volume of 120 L. The temperature of flash drum 60 was a temperature of 155 deg C. and a pressure of 0.5 MPa. The composition of light fraction stream 160 and heavy fraction stream 162 are shown in Table 2.

TABLE 2

Properties of light fraction stream and heavy fraction stream

| Properties | | Light Fraction Stream | Heavy Fraction Stream |
|---|---|---|---|
| Water Content | | 97.5% by weight | 3.4% by weight |
| Hydrocarbons | Mass Distribution | 1 | 99 |
| | API Gravity | 33 | 15 |
| | Asphalthene Content | — | 7% by weight |
| | T20 | — | 410 deg C. |
| | Olefin Content | — | 2.5% by weight |

Storage tank 70 was a storage bottle and heavy fraction stream 162 was collected in it. The oxidizing reactor feed was about 50 milliliters (ml) or 48 grams (g) of the heavy fraction and was placed in oxidation reactor 75. Oxidation reactor 75 was an autoclave-type reactor having an internal volume of 500 ml. Oxygen source 174 was air provided by a dip tube placed inside the reactor. The flow rate of oxygen source 174 was adjusted to 100 ml/min at SATP. The pressure in oxidation reactor 75 was controlled by oxygen source 174 to be at 50 pounds per square inch gauge (psig). Oxidation reactor 75 had an agitator set to rotate at 500 revolutions per minute (rpm) to mix the internal fluid. The temperature in oxidation reactor 75 was increased from room temperature to 230 deg C. over 1 hour and then maintained at that temperature for 1 hour. Then the reactor internal was cooled back to room temperature by putting the reactor body in a water bath maintained at 15 deg C. The product from oxidation reactor 75 was extracted with n-heptane leaving blown asphalt having the properties in Table 3. [Is the asphaltene obtained in the Examples blown asphalt?]

TABLE 3

Properties of Blown Asphalt of Example 1

| Properties | Blown Asphalt |
|---|---|
| Recovery from the reaction product | 19% by weight |
| Viscosity at 210 deg F. | 590 cSt |
| Softening Point (ASTM D-36) | 65 deg C. |
| Penetration at 25 deg C. (ASTM D-5) | 0.3 mm |

Example 2

This is a comparative example. A hydrocarbon of the same atmospheric residue fraction from the Arab heavy crude oil with an API gravity of 10.3, a sulfur content of 5.2% by weight, and an asphaltene fraction of 10% by weight as in Example 1 was added to the same autoclave-type reactor used in Example 1 as oxidation reactor 75 under the same conditions, including operating temperature, reaction time, air flow rate, and reaction pressure, without first subjecting the hydrocarbon to a supercritical water process.

As in Example 1, the product from the autoclave-type reactor was extracted with n-heptane leaving the blown asphalt having the properties in Table 4.

TABLE 4

Properties of Blown Asphalt of Example 2

| Properties | Blown Asphalt |
|---|---|
| Recovery from the reaction product | 12% by weight |
| Viscosity at 210 deg F. | 580 cSt |
| Softening Point (ASTM D-36) | 59 deg C. |
| Penetration at 25 deg C. (ASTM D-5 | 0.3 mm |

As compared to the blown asphalt in Example 1, less of the asphaltene fraction was recovered in Example 2. The combination of a supercritical water reactor and an oxidation reactor results in a greater recovery (yield) of blown asphaltene and a blown asphalt with a greater softening point, which is advantageous.

Although described in detail, it should be understood that various changes, substitutions, and alterations can be made hereupon without departing from the principle and scope. Accordingly, the scope should be determined by the following claims and their appropriate legal equivalents. There various elements described can be used in combination with all other elements described herein unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art, except when these references contradict the statements made herein.

As used here and in the appended claims, the words "comprise," "has," and "include" and all grammatical variations thereof are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope.

That which is claimed is:

1. A system for producing blown asphalt, the system comprising:
   a mixer, the mixer configured to mix a heated hydrocarbon stream and a supercritical water to produce a mixed stream;
   a supercritical water reactor fluidly connected to the mixer, the supercritical water reactor configured to produce a reactor effluent;
   a cooler fluidly connected to the supercritical water reactor, the cooler configured to reduce the temperature of the reactor effluent to produce a cooled effluent;
   a depressurizing device fluidly connected to the cooler, the depressurizing device configured to reduce the pressure of the cooled effluent to produce a depressurized stream;
   a flash drum fluidly connected to the depressurizing device, the flash drum configured to separate the depressurized stream to produce a light fraction stream and a heavy fraction stream;
   a storage tank fluidly connected to the flash drum, the storage tank configured to store the heavy fraction stream; and
   an oxidation reactor fluidly connected to the storage tank, the oxidation reactor configured to produce a product effluent.

2. The system of claim 1, further including:
   a feedstock pump, the feedstock pump configured to increase a pressure of a hydrocarbon feedstock to produce a pressurized feedstock;
   a feedstock exchanger fluidly connected to the feedstock pump, the feedstock exchanger configured to increase the temperature of the pressurized feedstock to produce the heated hydrocarbon stream;
   a water pump, the water pump configured to increase a pressure of the water feed to produce a pressurized water; and
   a water heater fluidly connected to the water pump, the water heater configured to increase the temperature of the pressurized water to produce the supercritical water.

3. The system of claim 1, further including:
   a lights cooler fluidly connected to the flash drum, the lights cooler configured to reduce the temperature of the light fraction stream in the lights cooler to produce a cooled light fraction;
   a vapor separator fluidly connected to the lights cooler, the vapor separator configured to separate the cooled light fraction to produce a vapor stream and a liquid stream; and
   an oil separator fluidly connected to the vapor separator, the oil separator configured to separate the liquid stream to produce an upgraded hydrocarbon stream and a water stream, where the upgraded hydrocarbon stream comprises upgraded hydrocarbons.

4. The system of claim 1, further including
   a solvent deasphalting unit fluidly connected to the flash drum, the solvent deasphalting unit configured to separate the heavy fraction to produce an asphaltene stream and a maltene stream;
   the storage tank fluidly connected to the solvent deasphalting unit; and
   the oxidation reactor fluidly connected to the storage tank, the oxidation reactor configured to produce an asphaltene product, where the asphaltene product comprises an oxidized asphaltene fraction.

5. The system of claim 1, where a hydrocarbon feedstock of the heated hydrocarbon feedstock is selected from the group consisting of whole range crude oil, reduced crude oil, atmospheric distillates, atmospheric residue, vacuum distillates, vacuum residue, cracked product streams, produced oils, decanted oil, heavy hydrocarbon streams from an ethylene plant, liquefied coal, biomaterial-derivatives and combinations thereof.

6. The system of claim 1, where a ratio of the volumetric flow rate of the heated hydrocarbon stream to the volumetric flow rate of supercritical water is between 1:10 and 10:1 at SATP.

7. The system of claim 1, where reaction temperature in the supercritical water reactor is greater than the critical temperature of water, a reaction pressure in the supercritical water reactor is between 23 MPa and 35 MPa, and a residence time in the supercritical water reactor is between 5 seconds and 30 minutes.

8. The system of claim 1, where the oxidation reactor is a semi-batch reactor.

9. The system of claim 1, where an oxidation temperature in the oxidation reactor is between 150 deg C. and 300 deg C., an oxidation pressure in the oxidation reactor is between 1 psig and 100 psig, and a reaction time in the oxidation reactor is between 10 minutes and 240 minutes.

* * * * *